United States Patent
Barua et al.

(10) Patent No.: US 7,822,755 B2
(45) Date of Patent: Oct. 26, 2010

(54) METHODS OF PROCESSING AND SEGMENTING WEB USAGE INFORMATION

(75) Inventors: Ankur Barua, Sunnyvale, CA (US);
Sanjay Wahi, Palo Alto, CA (US);
Larry Weyer, San Mateo, CA (US)

(73) Assignee: Yahoo! Inc., Sunnyvale, CA (US)

( * ) Notice: Subject to any disclaimer, the term of this patent is extended or adjusted under 35 U.S.C. 154(b) by 888 days.

(21) Appl. No.: 11/714,502

(22) Filed: Mar. 6, 2007

(65) Prior Publication Data
US 2008/0222284 A1 Sep. 11, 2008

(51) Int. Cl.
*G06F 17/30* (2006.01)

(52) U.S. Cl. .................. 707/755; 707/802; 708/223; 708/224

(58) Field of Classification Search .......... 707/999.102, 707/755, 802; 709/223, 224
See application file for complete search history.

(56) References Cited

U.S. PATENT DOCUMENTS

| | | | | |
|---|---|---|---|---|
| 6,341,310 B1 * | 1/2002 | Leshem et al. | ............. | 709/223 |
| 6,763,388 B1 * | 7/2004 | Tsimelzon | ................. | 709/228 |
| 6,836,773 B2 * | 12/2004 | Tamayo et al. | .................... | 1/1 |
| 7,065,532 B2 * | 6/2006 | Elder et al. | ....................... | 1/1 |
| 7,085,682 B1 * | 8/2006 | Heller et al. | ................ | 702/186 |
| 7,117,193 B1 * | 10/2006 | Basko et al. | ....................... | 1/1 |
| 7,685,273 B1 * | 3/2010 | Anastas et al. | .............. | 709/224 |
| 2002/0087679 A1 * | 7/2002 | Pulley et al. | ................. | 709/224 |
| 2002/0147570 A1 * | 10/2002 | Kraft et al. | .................. | 702/186 |
| 2002/0178214 A1 * | 11/2002 | Brittenham et al. | ......... | 709/203 |
| 2002/0178254 A1 * | 11/2002 | Brittenham et al. | ......... | 709/224 |
| 2003/0014350 A1 * | 1/2003 | Duell et al. | .................... | 705/37 |
| 2005/0071465 A1 * | 3/2005 | Zeng et al. | ................... | 709/224 |
| 2006/0277212 A1 * | 12/2006 | Error | .......................... | 707/102 |
| 2007/0011304 A1 * | 1/2007 | Error | .......................... | 709/224 |
| 2007/0027754 A1 * | 2/2007 | Collins et al. | ................. | 705/14 |
| 2007/0027768 A1 * | 2/2007 | Collins et al. | ................. | 705/14 |
| 2007/0294340 A1 * | 12/2007 | Rothschild | .................... | 709/203 |
| 2008/0222284 A1 * | 9/2008 | Barua et al. | .................. | 709/224 |
| 2008/0294495 A1 * | 11/2008 | Jain et al. | ..................... | 705/10 |
| 2009/0248608 A1 * | 10/2009 | Ravikumar et al. | ........... | 706/55 |
| 2009/0271514 A1 * | 10/2009 | Thomas et al. | .............. | 709/224 |

* cited by examiner

*Primary Examiner*—Charles Rones
*Assistant Examiner*—Mellissa M Chojnacki
(74) *Attorney, Agent, or Firm*—Stattler-Suh PC

(57) ABSTRACT

A massive amount of information is collected when tracking statistics such as web site usage data. To simplify the analysis of such data, it is advantageous to process and segment the web site usage data. One proposed method of segmenting the data is to create a reverse sorted associative container for each different web section of a web site. Page-views, time-spent, sessions, and other web viewing metrics may be used as keys in the reverse sorted associative container and web viewer identifiers are used as values associated with the page-view value keys. After creating the reverse sorted associative containers, each reverse sorted associative container is segmented on a percentile basis.

14 Claims, 4 Drawing Sheets

Sports (Total = 1)

| Views | Viewers |
|---|---|
| 9 | A |

News (Total = 1)

| Views | Viewers |
|---|---|
| 11 | A |

Figure 3A

Sports (Total = 1)

| Views | Viewers |
|---|---|
| 9 | A |

News (Total = 2)

| Views | Viewers |
|---|---|
| 11 | A |
| 5 | B |

Finance (Total = 1)

| Views | Viewers |
|---|---|
| 12 | B |

Figure 3B

Sports (Total = 1)

| Views | Viewers |
|---|---|
| 9 | A |

Fashion (Total = 1)

| Views | Viewers |
|---|---|
| 7 | C |

News (Total = 3)

| Views | Viewers |
|---|---|
| 11 | A |
| 5 | B,C |

Finance (Total = 1)

| Views | Viewers |
|---|---|
| 12 | B |

Sports (Total = 12)

| Views | Viewers |
|---|---|
| 13 | K |
| 11 | H |
| 10 | V |
| 9 | A |
| 8 | F, N |
| 7 | O, R |
| 4 | D, G |

Fashion (Total = 13)

| Views | Viewers |
|---|---|
| 14 | M |
| 13 | V |
| 10 | K, O |
| 9 | R |
| 8 | H, T |
| 7 | C |
| 4 | E, P |
| 3 | I, U |

News (Total = 20)

| Views | Viewers |
|---|---|
| 13 | V |
| 11 | A, G, J |
| 10 | E |
| 9 | K, L |
| 8 | F, M, N, P |
| 7 | D, Q, T |
| 5 | B, C, I, S |
| 4 | H, R |

Finance (Total = 16)

| Views | Viewers |
|---|---|
| 12 | B, Q |
| 10 | P |
| 9 | I, L, N, U |
| 8 | E, R |
| 7 | K |
| 5 | D, H, O |
| 4 | F, J, S |

METHODS OF PROCESSING AND SEGMENTING WEB USAGE INFORMATION

FIELD OF THE INVENTION

The present invention relates to the field of marketing data analysis. In particular the present invention discloses techniques for sorting and segmenting internet viewer data.

BACKGROUND OF THE INVENTION

The global Internet has become a mass media on par with radio and television. And just like radio and television content, the content on the Internet is largely supported by advertising dollars. The main advertising supported portion of the Internet is the "World Wide Web" that displays HyperText Mark-Up Language (HTML) documents distributed using the HyperText Transport Protocol (HTTP).

As with any advertising-supported business model, there needs to be reliable systems for collecting information on what the web viewers are interested in viewing and how much each item is viewed. Radio and television advertising use ratings services that assess how many people are listening to a particular radio program or watching a particular television program in order to analyze viewer interest in the various programs. With the World Wide Web portion of the Internet, web site publishers have the luxury of being able to collect detailed web viewer information since each and access to a web page access requires the web site server to receive a request and provide a response. Thus, when any web page request is received by a web site server, a web site usage accounting system on that server can count the web page viewing and store information about the web page request.

Since every single web page view can be counted, the web site usage accounting system creates an enormous volume of valuable web viewer information. In order to effectively analyze this enormous volume of web viewer information, data analysis tools are required. Thus, it would be very desirable to create tools that efficiently segment the enormous volume of web viewer information into smaller groups and process the information.

SUMMARY OF THE INVENTION

The present invention introduces methods for processing and segmenting web site usage data. In the system of the present invention, a reverse sorted associative container is created for each different web site section. Page-view, time-spent, sessions, and other web viewing metrics may be used as keys in the reverse sorted associative container and web viewer identifiers are used as values associated with the page-view value keys. After creating the reverse sorted associative containers, each reverse sorted associative container is segmented on a percentile basis.

Other objects, features, and advantages of present invention will be apparent from the accompanying drawings and from the following detailed description.

BRIEF DESCRIPTION OF THE DRAWINGS

The objects, features, and advantages of the present invention will be apparent to one skilled in the art, in view of the following detailed description in which:

FIG. 3A illustrates a set of reverse associative containers created after processing the first row of web usage data in Table 1.

FIG. 3B illustrates the set of reverse associative containers of FIG. 3A after processing the second row of web usage data in Table 1.

FIG. 3C illustrates the set of reverse associative containers of FIG. 3B after processing the third row of web usage data in Table 1.

FIG. 3D illustrates a set of reverse associative containers after processing all of web usage data in Table 1.

DETAILED DESCRIPTION

Methods for sorting and segmenting internet viewer data are disclosed. In the following description, for purposes of explanation, specific nomenclature is set forth to provide a thorough understanding of the present invention. However, it will be apparent to one skilled in the art that these specific details are not required in order to practice the present invention. Furthermore, although the present invention is mainly described with reference to web viewer information gathered using the World Wide Web and the HyperText Transport Protocol (HTTP), the same techniques can easily be applied to other types of information.

Tracking World Wide Web Site Access

Figure 1:
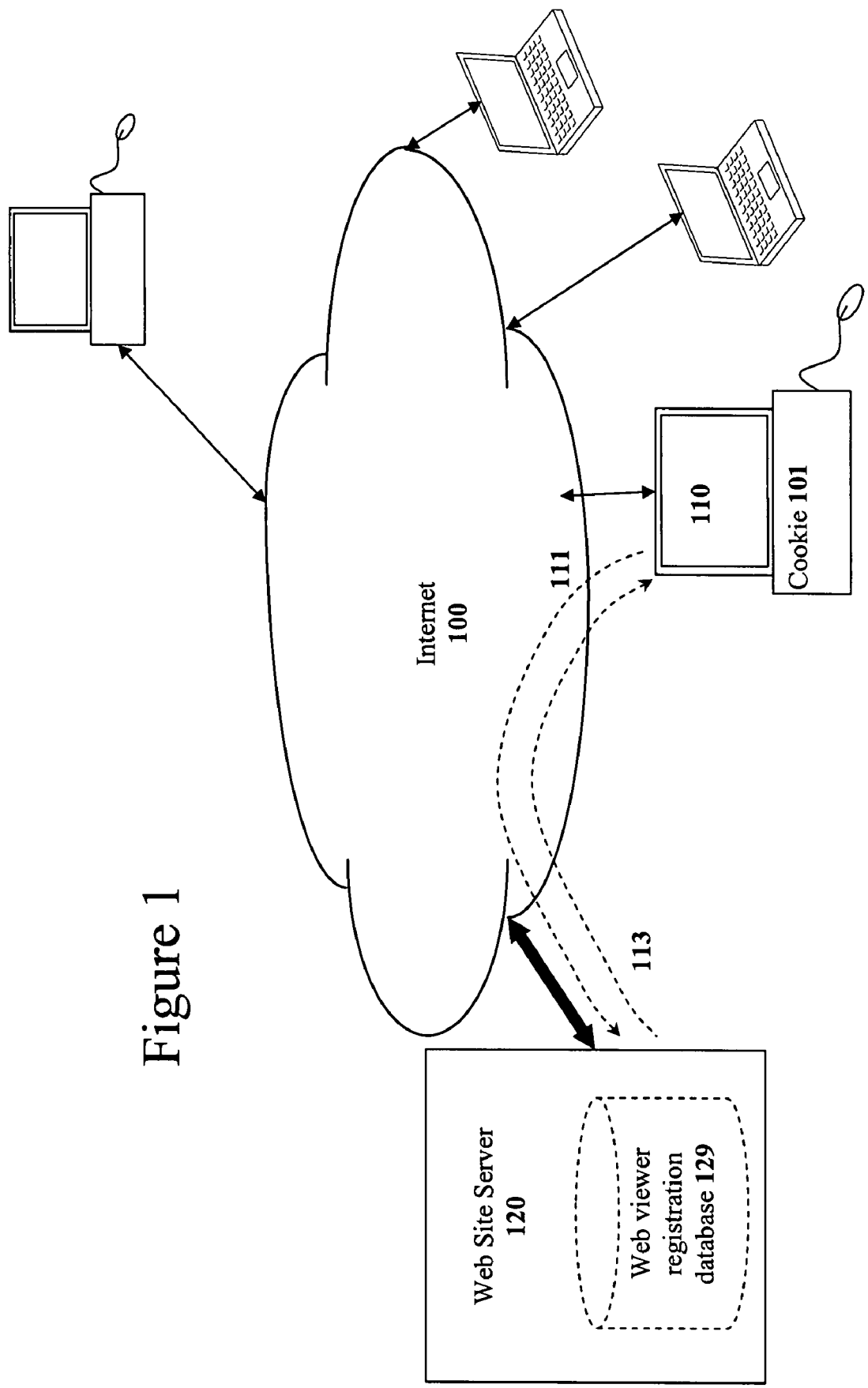
FIG. 1 illustrates a conceptual diagram of a personal computer accessing a web site server on the Internet.

Any time a web viewer accesses a web page, there is a request sent to the web site server and a response sent back to the web viewer's web browser program. For example, referring to FIG. 1, when a web viewer at personal computer 110 accesses a web page on web site server 120, a request 111 is sent across the internet to web site server 120. When the web site server 120 receives request 111, a web site usage accounting system can make note of the web page request along with other information such as the time of the request, the specific web page that was requested, the Internet Protocol (IP) address of personal computer 110, etc. Tracking the web page requests of every web browser generates a huge volume of information. However, the information is relatively primitive.

In order to collect more detailed (and thus more useful) web viewer information, the web site usage accounting system can take advantage of web browser 'cookies'. A web browser cookie is a string of text sent by a web site server to a web browser that is then stored locally by the web browser. Referring back to FIG. 1, web site server 120 could send cookie 101 to the web browser on personal computer 110. Upon all subsequent accesses to the same web site, the web browser sends the web browser cookie back to the web site. Thus, in all subsequent requests from personal computer 110 to a web page on web site server 120 will include the browser cookie 101. In this manner, web site server 120 may assign a unique browser cookie to each web viewer such that the web site usage accounting system can be used to track the web site access of each user individually.

To provide more targeted web viewing information, a web site may be divided into different sections that provide different information or different services to web site viewers. In this manner, the web site publisher can analyze the relative popularity of the different web site sections or services. For example, a web site may be divided into common newspaper sections such as news, fashion, sports, finance, and other sections. The web site may track the web site viewings of those different sections individually. In this manner, the web site publisher can determine the relative popularity of the different sections.

The web site publisher can combine the web site section information with the user information to generate very detailed web site usage reports. For example, the web site publisher can determine the particular interests of the different web viewers by determining which sections each web viewer visits most. With this information, the web site publisher may target advertisements that match the web viewer's interests.

Processing and Organizing Web Site Tracking Information

As previously set forth, there is an enormous amount of web site tracking information collected. To effectively use this wealth of information, it must be processed and organized effectively.

One aspect of the web site tracking information processing is to filter information that is not relevant. Internet search engines use 'web crawlers' that are automated programs that explore web sites. It is not useful to track the web viewing habits of web crawlers, thus accesses to the web site by web crawlers should be discarded. Furthermore, random accesses by viewers that only access the web site only once or twice are not considered to be worth tracking since there is little reason to attract such infrequent web site viewers.

Even after the web tracking information from web crawlers and super-light users is discarded, there is still an extremely large amount of web viewer information to analyze. Thus, it is desirable to segment the web site usage tracking information even further.

Scalable Web Tracking Data Processing and Segmentation

The present invention introduces an automated and scalable method for processing, segmenting, and reporting on web site usage activity. Although the present invention is presented with reference to World Wide Web site usage as tracked with the aid of browser cookies, the teachings of the present invention can be used in many other contexts. In the example to be presented, the web site usage activity is divided into heavy, medium, and light user groups. Furthermore, extreme heavy usage as determined by thresholds calculated is filtered since such activity is likely from automated applications.

In addition to segmenting the web site usage activity, the method of the present invention further divides the web site usage information up based upon the different web sections. In the example to be presented, a set of web site sections similar to newspaper sections are used. Note that the web sections could be used to denote any difference in web views. For example, the web site usage information could be divided into different countries or different services.

Figure 2:
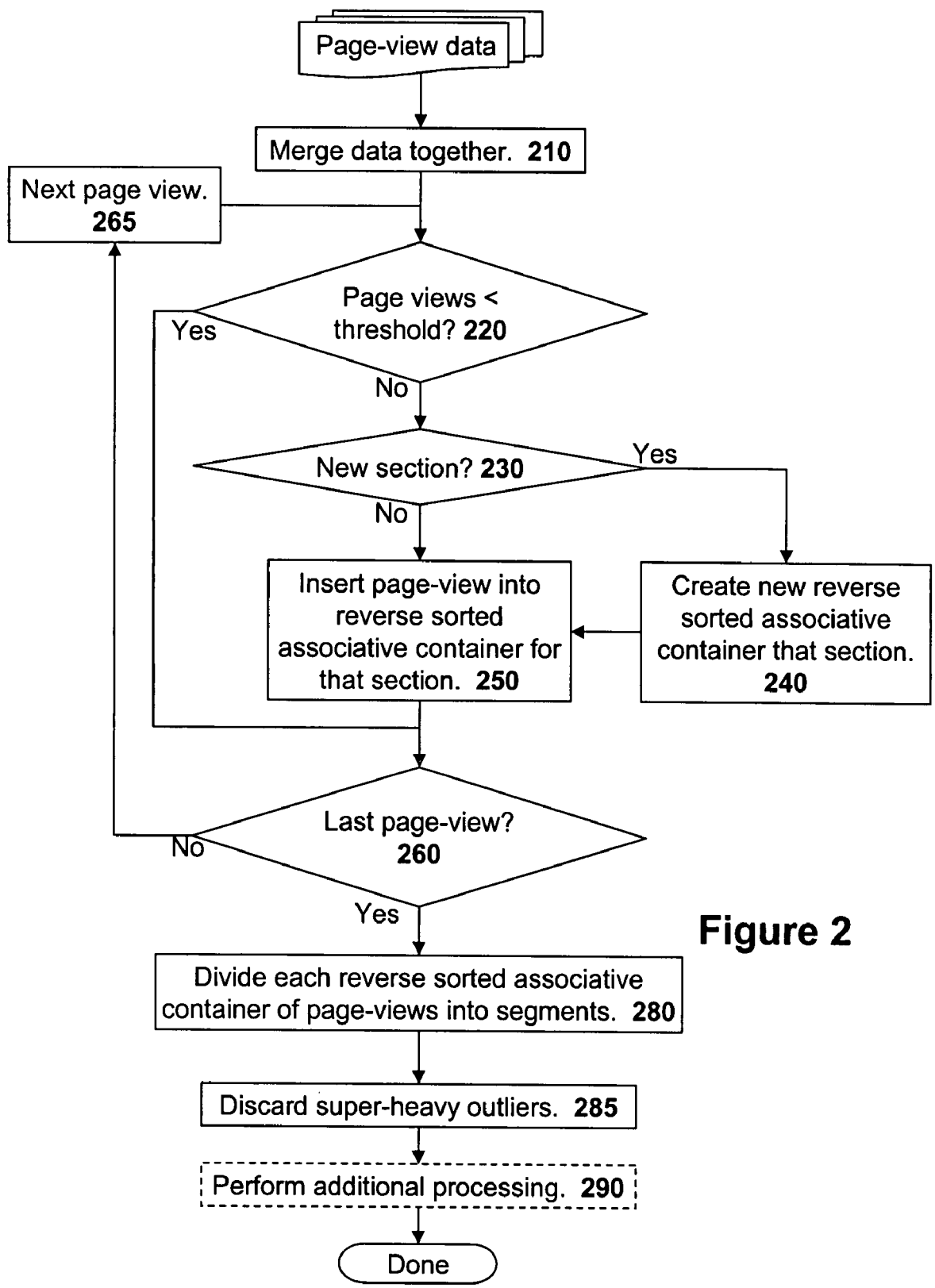
FIG. 2 illustrates a flow diagram that generally describes how the web usage information processing and segmenting system of the present invention operates.

FIG. 2 illustrates a flow diagram describing the overall data processing and segmenting method of the present invention. Referring to FIG. 210, the first step is to collect and merge together all of the page view data. After all of the page-view data has been collected, the system of the present invention begins to process all of the page-view data.

In one embodiment, the first step is to discard the page-views of super-light web site users. Thus, at step 220, the system tests if the number of page-views is less than a threshold value. If the page-view number is less than the threshold, the system discards that page-view number by skipping forward to the next page-view record. Otherwise, the system proceeds to the next step in processing the page view.

At step 230, the system determines if this page-view number is for a web site section that the system has not encountered yet. Since the system of the present invention allows the web site page-view to be divided up into different sections, the data processing system handles the data from each different web site section independently. Thus, if this is a new web site section that is encountered, the system proceeds to step 240 to create a new data structure for the section. Note that this allows new web site sections to be added to the web site at any time and independent web site usage data will be obtained for the new sections without having to change the code for processing the web site usage data.

The data structure created for each web site section is a reverse sorted associative container. A sorted associative container is a data structure as an abstract data type composed of a sorted collection of keys and a collection of values, wherein each key is associated with at least one value. In the present invention, the created reverse sorted associative container will use the number of page-views as keys and the values will be identifiers associated with the web viewers with that number of page views. The identifier may be the cookie from the web viewer's web browser, a username, or any other unique identifier for the web viewers. Note that the sorted associative containers are 'reverse' sorted associative containers in that the largest page-view values are placed at the top of the container.

If the page view was not from a new section as tested in step 230 or after a new reverse sorted associative container has been created at step 240, then the page-view is entered into the reverse sorted associative container for that section. If there already exists a key for that page-view number then the identifier of the web viewer is added to set of values for that page-view number/key.

After adding a page view to a reverse-sorted associative container at step 250 (or skipping the page-view from step 220) the system determines if this is the last page view at step 265. If this is not the last page-view, the system moves to step 265 wherein it moves to the next page-view and then back to step 220 to process the next page-view.

After the last page-view has been processed, the system will proceed to step 280. At this point, all of the page-views have been placed into reverse sorted associative containers for each different section with the highest number of page-views first. At step 280, the reverse sorted associative containers are each segmented into different groups on a percentile basis. In one embodiment, the top 0.2% represents a super-heavy user outlier group. The next 20% of page-views represents a heavy user group. The next 30% of page views represents a medium user group. All the remaining page-views represent a light user group. (Note that the super-light users were discarded at step 220.) In one embodiment, page-view thresholds are calculated for each web section for the Heavy, Medium and Light segments of users. This is done by iterating the reverse associative containers from top till the percentile users are reached. The last user's page-view for that percentile (for that web section) is the threshold for the segment (as defined by the percentile).

After calculating the page-view thresholds for each segment for each web section at step 280, the super-heavy users may be discarded at step 285. As set forth earlier, these super-heavy users are generally automated web crawler robots such that these super-heavy users are not useful from a marketing perspective. Finally, the page-view thresholds that have been calculated for the different properties and on the basis of that users segmented into different usage groups may be further processed at step 290. Many different metrics may be calculated for each web-section usage. Segmentation can also be performed on the basis of any other usage metrics such as time-spent by users on the web section, clicks on the ads, sessions etc. Page-view is just used as an example.

To fully describe the method of the present invention, a small example will be presented with reference to the flow chart of FIG. 2. The following table contains the page-view information that will be used in the example.

TABLE 1

Example Page-View Data

| Web Viewer | Sports views | Fashion Views | News Views | Finance Views |
|---|---|---|---|---|
| A | 9 | | 11 | |
| B | | | 5 | 12 |
| C | 1 | 7 | 5 | |
| D | 4 | | 7 | 5 |
| E | 4 | 4 | 10 | 8 |
| F | 8 | | 8 | 4 |
| G | 4 | | 11 | 1 |
| H | 11 | 8 | 4 | 5 |
| I | 1 | 3 | 5 | 9 |
| J | 9 | 7 | 11 | 4 |
| K | 13 | 10 | 9 | 7 |
| L | 1 | | 9 | 9 |
| M | 1 | 14 | 8 | 1 |
| N | 8 | | 8 | 9 |
| O | 7 | 10 | 2 | 5 |
| P | 9 | 4 | 8 | 10 |
| Q | 2 | 1 | 7 | 12 |
| R | 7 | 9 | 4 | 8 |
| S | 1 | 0 | 5 | 4 |
| T | | 8 | 7 | |
| U | 1 | 3 | | 9 |
| V | 10 | 13 | 13 | |

The example data processing will process the data of Table 1 from top to bottom and from left to right. Note that the data could be processed in any order and the same results would be achieved. For the threshold value in step 220, the value of three (3) will be used.

Starting at the upper left, web viewer A had 9 web views of the sports section. Thus, a reverse sorted associative container for the sports section is created and an entry is created with a key of 9 page-views and a value of 'A' (the identifier for web viewer A). The next page-view record is for 11 web views of the news section by web viewer A. Thus, a reverse sorted associative container for the news section is created and an entry is created with a key of 11 page-views and a value of 'A'. After processing the first row of page-views from Table 1, the reverse sorted associative containers will appear as depicted in FIG. 3A wherein there are two reverse sorted associative containers wherein each contains one entry. At the top of each reverse sorted associative container is a value that represents the total number of web viewers that have been put into the reverse sorted associative container.

Moving on to the second row of page-view data, web viewer B had 5 web page views in the News section. Thus, an entry with a key of 5 page views and a value of 'B' is added to the reverse sorted associative container for the news section. Web viewer B also viewed a Finance section 12 times. Thus, a new reverse sorted associative container is created for the newly encountered Finance section and the first entry with 12 page views as the key and 'B' as the value is added. After processing the second row of page-views from Table 1, the reverse sorted associative containers will appear as depicted in FIG. 3B.

In the third row of page-view data in Table 1, web viewer C viewed the Sports section of the web site only once. Since one (1) is less than the threshold value of page-views, the Sports page-view of web viewer C will be discarded in step 220 of FIG. 2. Web viewer C also viewed a Fashion section 7 times. Thus, a new reverse sorted associative container is created for the newly encountered Fashion section and the first entry with 7 page views as the key and 'C' as the value is added. Finally, web viewer C viewed the News section five (5) times. Since an entry for 5 page-views already exists in the reverse sorted associative container for the News section, web viewer C is added to that entry. Thus, after processing the third row of page-views from Table 1, the reverse sorted associative containers will appear as depicted in FIG. 3B.

The remainder of the page-view data in Table 1 is processed in this manner. FIG. 3D illustrates the final reverse sorted associative containers after all of the page-view data in Table 1 has been processed.

Referring back to FIG. 2, the next step is to divide each reverse sorted associative container into segments dependent on the amount of usage. As illustrated in FIG. 3D, each reverse sorted associative container is sorted by the number of page views with the highest page-view number at the top. To divide the page-view data into percentage segments, one simply multiplies the number of page-views in the reverse sorted associative container by the percentage and select that number of page-views from the top. To create groupings of Top 0.2%, next 20%, next 30%, and remainder segments for outlier, heavy, medium, and light users then multiplies 0.002, 0.2, and 0.3 by the total web viewers in the reverse sorted associative container and count those numbers starting at the top of the reverse sorted associative container.

This is best illustrated using an example. Referring to the News reverse sorted associative container of FIG. 3D contains the page-view information of 20 web viewers. The top 0.2% segment (the outlier segment) would be the first (0.002)×20=0.04 entries. Rounding to the nearest whole number would result in zero. (Note: this small example data set does not have any web viewers in the top 0.2% but the typical much larger data set would have web viewers in that top 0.2%.) The next 20% (the heavy web viewers) would be the next (0.2)×20=4 entries. And the next 30% (the medium web viewers) would be the next (0.3)×20=6 entries. The remaining web viewers would be the light web viewer group.

The web viewers may be counted literally or counted in a manner that ensures web viewers with the same number of page-views are not placed into different segments. For example, literally counting the first 4 entries of the News reverse sorted associative container of FIG. 3D would result in web viewers V, A, G, and J for the heavy web viewers and literally counting the next 6 entries would result in web viewers E, K, L, F, M, and N for the medium web viewers. However, this would place web viewer P in the light web viewer segment even though it has the same number of page-views (8) as web viewers F, M, and N in the medium web viewer segment. To prevent this situation, one count full groups of web viewers until the number of web viewers needed is reached or exceeded. In this manner, the heavy web viewer segment would be web viewers V, A, G, and J (the full groups until 4 viewers were reached) and the medium web viewer segment would be web viewers E, K, L, F, M, N, and P (the full groups until the 6 viewers were reached or exceeded).

Referring back to FIG. 2, the super-heavy outliers may be discarded at step 285. Finally, additional processing may be performed on the data at step 290. Note that the page-view thresholds between the different segments determined in the previous paragraph may be used in the data processing.

The foregoing has described a number of techniques for processing and segmenting web usage data. It is contemplated that changes and modifications may be made by one of ordinary skill in the art, to the materials and arrangements of elements of the present invention without departing from the scope of the invention.

We claim:

1. A method of processing web site usage information, said method comprising:
    creating a sorted associative container for each of a plurality of web site sections;
    placing web site usage metric data for each web site section into said sorted associative containers;
    segmenting said sorted associative containers into different usage groups based upon the web site usage metric;
    wherein said segmenting comprises dividing said sorted associative containers on a percentile basis; and
    wherein said sorted associative containers are reverse sorted such that higher values are first.

2. The method of processing web site usage information as set forth in claim 1 wherein said sorted associative containers use web site usage metric data as keys and web viewers as identifiers.

3. The method of processing web site usage information as set forth in claim 1 wherein web site usage metric data comprises page-views.

4. The method of processing web site usage information as set forth in claim 1 wherein web site usage metric data comprises time-spent.

5. The method of processing web site usage information as set forth in claim 1 further comprising the step of:
    discarding web site usage data smaller than a predetermined threshold.

6. The method of processing web site usage information as set forth in claim 2 wherein said segmenting divides said sorted associative containers into super-heavy, heavy, medium, and light usage web viewers.

7. The method of processing web site usage information as set forth in claim 1 wherein said different web site sections comprise different web site services.

8. A computer-readable medium, said computer-readable medium comprising a series of instructions for processing web site usage information, said series of instructions implementing the steps of:
    creating, using the computer, a sorted associative container for each of a plurality of web site sections;
    placing web site usage metric data for each web site section into said sorted associative containers;
    segmenting said sorted associative containers into different usage groups based upon the web site usage metric data;
    wherein said segmenting comprises dividing said sorted associative containers on a percentage basis; and
    wherein said sorted associative containers are reverse sorted such that higher values are first.

9. The computer-readable medium as set forth in claim 8 wherein said sorted associative containers use web site usage metric data as keys and web viewers as identifiers.

10. The computer-readable medium as set forth in claim 8 wherein said web site usage metric data comprises page-views.

11. The computer-readable medium as set forth in claim 8 wherein said web site usage metric data comprises time-spent.

12. The computer-readable medium as set forth in claim 8, said instructions further implementing the step of:
    discarding page-views smaller than a pre-determined threshold.

13. The computer-readable medium as set forth in claim 8 wherein said segmenting divides said sorted associative containers into super-heavy, heavy, medium, and light usage web viewers.

14. The computer-readable medium as set forth in claim 1 wherein said different web site sections comprise different web site services.

* * * * *